J. W. JEPSON.
ELECTRICAL SYSTEM OF DISTRIBUTION.
APPLICATION FILED AUG. 24, 1915.
1,287,331.
Patented Dec. 10, 1918.
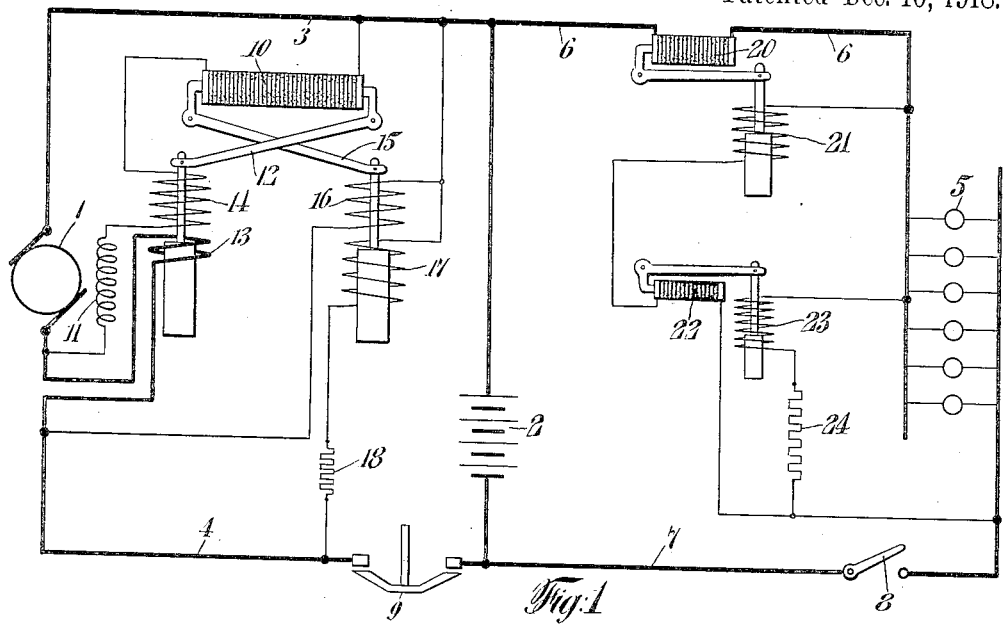
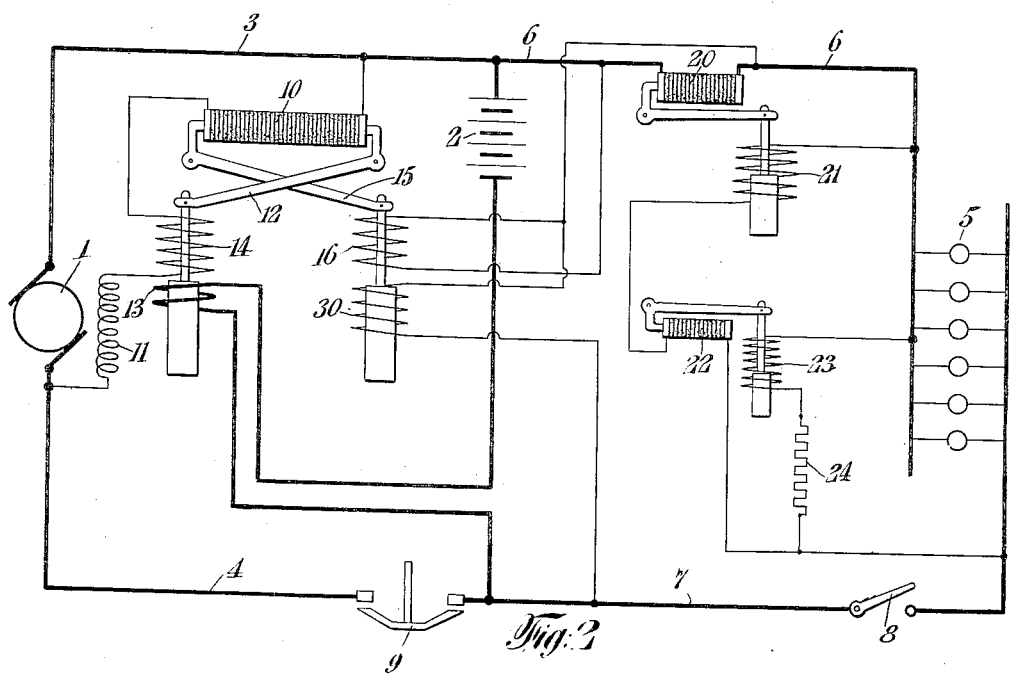
INVENTOR
John W. Jepson
BY
Kenyon & Kenyon
ATTORNEYS

UNITED STATES PATENT OFFICE.

JOHN W. JEPSON, OF BUFFALO, NEW YORK, ASSIGNOR TO GOULD COUPLER COMPANY, A CORPORATION OF NEW YORK.

ELECTRICAL SYSTEM OF DISTRIBUTION.

1,287,331.  Specification of Letters Patent.  Patented Dec. 10, 1918.

Application filed August 24, 1915. Serial No. 47,029.

*To all whom it may concern:*

Be it known that I, JOHN W. JEPSON, a citizen of the United States, and a resident of Buffalo, county of Erie, State of New York, have invented certain new and useful Improvements in Electrical Systems of Distribution, of which the following is a specification.

My invention relates to electrical systems of distribution, and more particularly to systems in which the generator is driven at variable speed. Systems of this kind are commonly used for the electric lighting of railway cars, wherein the generator is driven from a car axle, and adapted to supply a storage battery and a lamp or work circuit. In such systems the generator begins to supply current to the battery or lamps, or both when the train is running from 15 to 20 miles an hour, and will continue to supply current up to the maximum speed of the train, which may be 60 or 70 miles an hour. It will therefore be seen that the variations in speed of the generator are very great. While at the lower speeds, the generator will supply a comparatively large current in a very efficient manner, yet, at the higher speeds it is found that if a large current is taken from the generator, commutation troubles are experienced, in that sparking at the commutator brushes is produced. In order to avoid this disadvantage, I provide a system in which the generator current is automatically reduced when the speed is high.

Further objects, features and advantages will more clearly appear from the detailed description given below, taken in connection with the accompanying sheet of drawings, which forms a part of this specification.

In the drawings Figure 1 is a diagram illustrating a system embodying my improvements in one form. Fig. 2 is a diagram illustrating a modified form of system.

Referring to Fig. 1, 1 represents a generator driven at variable speed, 2 a storage battery connected to be charged thereby through the mains 3 and 4, and 5 a lamp or work circuit, connected across the battery and generator through the mains 6 and 7. 8 represents a switch, through which the work circuit can be connected and disconnected from the battery and generator. 9 represents a switch of any suitable kind, adapted to connect the generator to the battery and work circuit, when it had attained sufficient speed. 10 represents a carbon pile rheostat connected in series with the generator shunt field windings 11. Operating upon one end of the pile 10 is a lever 12, controlled by a solenoid having a winding 13, connected in the main 4 serially between the generator and battery, and a coil 14 serially connected with the generator shunt field and wound to oppose the coil 13. Operating upon the other end of the carbon pile 10 is a lever 15, controlled by a solenoid having a coil 16, connected across the generator to be responsive to voltage changes of the generator and battery, and a coil 17, wound to oppose the coil 16, also connected across the generator and battery and having in series therewith a resistance 18, so designed and arranged that it is not materially affected by temperature changes. The purpose of adding the opposing coil 17 with the resistance 18 is to provide means for compensating for the effect of temperature changes on the potential coil 16, so that the pull of the solenoid is not materially affected by temperature changes.

During the charging of the battery, coil 13 acts to tend to maintain the generator current substantially constant. If the current tends to increase above a predetermined value for which the solenoid is set, it raises the lever 12, thus increasing the resistance of pile 10, and weakening the shunt field of the generator, thereby cutting down the generator voltage and generator current to the desired value. A tendency for the generator current to decrease acts in a reverse manner. As the generator speed increases, however, thereby causing the coil 13 to insert more and more resistance in series with the generator field, the opposing coil 14 is considerably weakened, so that less current is required in coil 13 to maintain the desired balance. That is, coil 13 will act to cause the generator to furnish less current, so that with an increase in speed of the generator, its current output is reduced to avoid injurious sparking at the commutator brushes.

When the battery becomes substantially charged, the solenoid, comprising coils 16 and 17, becomes of sufficient strength to raise the lever 15, and thus controls the carbon pile 10, so as to limit the voltage of the generator and thus cause the battery charging current to taper off. The solenoid comprising coils 13 and 14 then becomes ineffective, as far as the regulation of the generator is concerned.

In order that the variations in charging voltage may not fall upon the work circuit 5, a carbon pile rheostat 20 is placed in circuit between the battery and work circuit, and controlled by a solenoid 21, connected across the work circuit, but having in series therewith a carbon pile 22, controlled by a solenoid 23, also connected across the work circuit, and having in series therewith a resistance 24. If the voltage across the work circuit tends to increase, the strength of solenoid 23 is increased, thereby causing the resistance of pile 22 to be decreased, so that it materially strengthens coil 21, which acts to increase the resistance of pile 20, to an extent to maintain the voltage on the work circuit substantially constant. Any tendency for the voltage across the work circuit to decrease, results in a reverse operation.

The arrangement shown in Fig. 2 is substantially the same, except that the coil 13 is connected in the battery circuit so as to be responsive only to battery current changes, instead of to total current changes. Also the voltage controlling coil 16, instead of being connected directly across the battery and generator, is connected across the work circuit regulator 20, so as to be responsive to changes in voltage drop therein, so that when the battery voltage rises to a point where it indicates the battery is substantially charged, the drop in potential across the work circuit regulator will increase sufficiently to cause the coil of the solenoid embracing coil 16, lever 15, to limit the generator voltage and cause the battery charging current to taper off. In order that sudden changes in voltage across the work circuit, due to the sudden throwing off and on of the load may not affect the generator regulation, the solenoid embracing coil 16 is provided with another coil 30, connected directly across the lamp circuit. Thus, when a sudden increase in voltage occurs across the work circuit regulator, as by suddenly throwing on more load on the work circuit, causing a temporary decrease in voltage across the work circuit, the increase in strength in coil 16 is offset by a decrease in strength of coil 30, so that the generator regulation is not materially affected thereby.

Although I have described my improvements in great detail and in connection with one arrangement for reducing the generator current upon an increase in speed of the generator, I do not desire to be limited to such details, or to the particular arrangements disclosed for effecting the generator current responsive to speed changes, since many other arrangements and many changes and modifications may well be made without departing from the spirit and scope of my invention, in its broader aspects.

Having fully and clearly described my invention what I claim as new and desire to secure by Letters Patent is:

1. In an electrical system of distribution wherein a variable speed dynamo charges a storage battery and a current regulator varies the resistance of the field circuit of the dynamo to tend to prevent speed changes from altering the current output of the dynamo, the combination with said current regulator of means for modifying its action to reduce the dynamo current as the speed of the dynamo increases.

2. In an electrical system of distribution, a shunt wound variable speed dynamo, a storage battery charged thereby, a current regulator adapted to vary the resistance of the field circuit to prevent substantial change of current with change of speed, and a modifying coil responsive to speed change effects and acting on said regulator to reduce the current with increase of speed of the dynamo.

3. In an electrical system of distribution, a variable speed shunt wound dynamo, a storage battery charged thereby, a dynamo regulator having means responsive to electrical fluctuations produced by speed changes to vary the field circuit resistance, to tend to produce substantial constancy of dynamo output and also responsive to the variations of field circuit current to reduce the dynamo output as the speed increases.

4. In an electrical system of distribution, the combination of a generator driven at variable speed, a storage battery charged thereby and means for causing the generator current to be decreased with an increase in speed thereof, said means including a coil serially connected between the generator and battery and a coil affected by changes in generator speed.

5. In an electrical system of distribution, a generator driven at variable speed, a storage battery and work circuit fed thereby, means regulating the generator output acting to decrease the generator current as its speed increases, said means including a coil serially connected between the generator and battery and a coil affected by changes in generator speed for regulating the generator current during the charging of the battery.

6. In an electrical system of distribution, a generator driven at variable speed, a storage battery and work circuit fed thereby, means regulating the generator output acting to decrease the generator current as its speed increases, said means including a coil serially connected between the generator and battery and a coil affected by changes in generator speed for regulating the generator current during the charging of the battery, and means whereby the generator voltage is limited upon the battery becoming charged to decrease the battery charging current.

7. In an electrical system of distribution the combination of a generator driven at variable speed, a storage battery charged thereby and means for causing the generator current to be decreased with an increase in speed thereof, said means including a variable resistance regulating the generator field, a coil serially connected between the generator and battery affecting said resistance and tending normally to maintain the current in the coil substantially constant and a coil coöperating therewith and affected by speed changes and acting to cut down said current with an increase in speed of the generator.

8. In an electrical system of distribution, the combination of a generator driven at variable speed, a storage battery charged thereby and means for causing the generator current to be decreased with an increase in speed thereof, said means including a variable resistance regulating the generator field, a coil serially connected between the generator and battery affecting said resistance and tending normally to maintain the current in the coil substantially constant and a coil coöperating therewith and affected by speed changes and acting to cut down said current with an increase in speed of the generator, said second coil being serially connected with the generator field whereby with an increase in speed it is weakened.

9. In an electrical system of distribution, including a generator driven at variable speed and a storage battery charged thereby, regulating apparatus for said generator including means tending to maintain the generator output unaffected by speed changes thereof and means coöperating therewith to give a definite decrease of generator output with increased speed of the generator.

In testimony whereof, I have signed my name to this specification.

JOHN W. JEPSON.